UNITED STATES PATENT OFFICE.

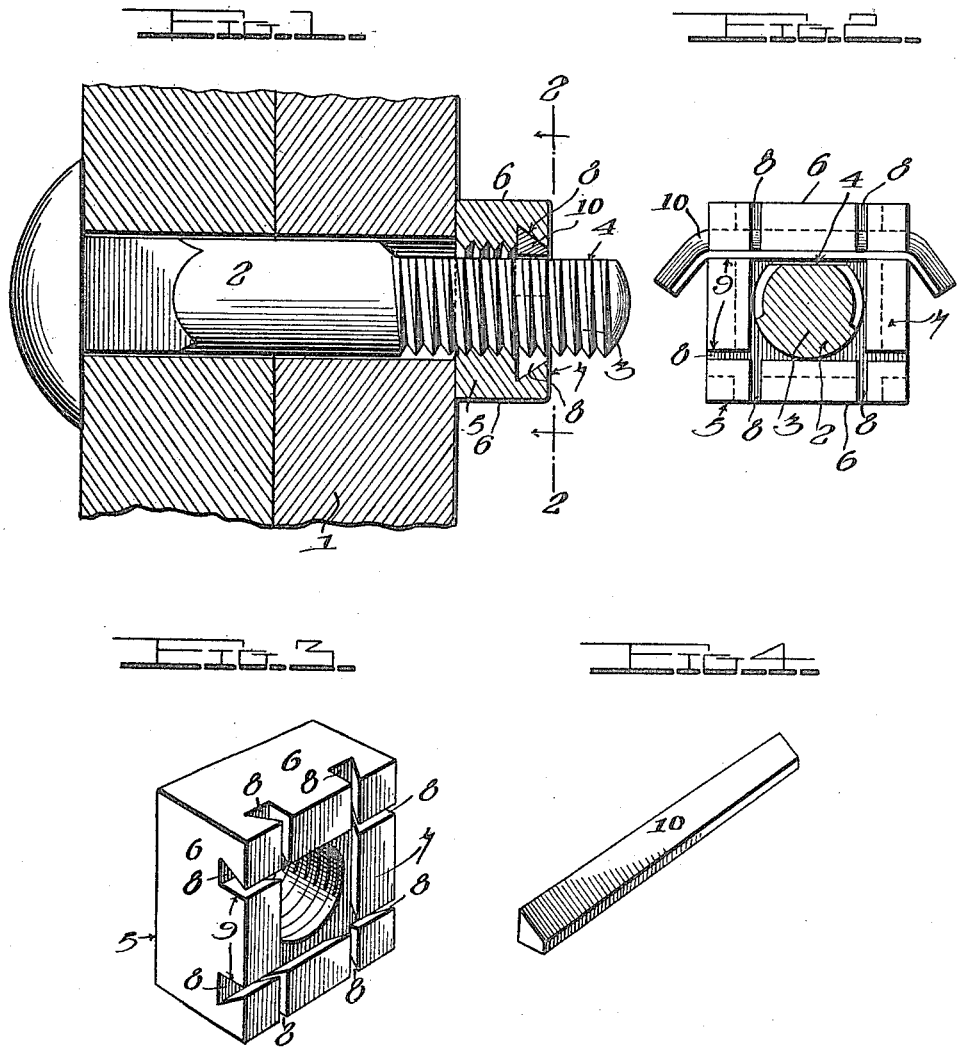

ARTHUR ASPLET, OF MURPHY, NORTH CAROLINA, ASSIGNOR OF ONE-HALF TO WILLIAM H. WOODBURY, OF MURPHY, NORTH CAROLINA.

NUT-LOCK.

1,226,440.          Specification of Letters Patent.          Patented May 15, 1917.

Application filed September 16, 1916. Serial No. 120,545.

*To all whom it may concern:*

Be it known that I, ARTHUR ASPLET, a subject of the King of Great Britain, residing at Murphy, in the county of Cherokee and State of North Carolina, have invented certain new and useful Improvements in Nut-Locks; and I do declare the following to be a full, clear, and exact description of the invention, such as will enable others skilled in the art to which it appertains to make and use the same.

This invention relates to new and useful improvements in nut locks, and the primary object of the invention is to provide a nut that is provided with a connecting key adapted to securely engage the same against the flat surface of a bolt to prevent the nut from becoming disengaged therefrom.

Another object of the invention is to provide a device of this character which is easily and simply constructed, inexpensive to manufacture and one which will be very efficient in operation.

With these and numerous other objects in view, my invention consists of the novel features of construction, combination and arrangement of parts which will be herein referred to and more particularly pointed out in the specification and claim.

In the accompanying drawings:

Figure 1 is a vertical section showing the application of this invention with the nut applied to a bolt, the bolt being shown in elevation;

Fig. 2 is a vertical section taken on the line 2—2 of Fig. 1;

Fig. 3 is a detail perspective of the nut; and

Fig. 4 is a detail perspective of the key.

In describing my invention, I shall refer to the drawings in which similar reference characters designate corresponding parts throughout the several views and in which in Fig. 1, the bolt is shown applied, and the numeral 1 designates the machinery or support, etc., through which the same is positioned. The bolt which is designated by the numeral 2 is of the conventional type and is provided along its threaded portion 3 with a longitudinally extending flat surface 4.

The nut 5 is also of the conventional type, being provided with square sides 6 and having in its outer face 7 a plurality of cross grooves 8. These grooves are of semi-dovetail shape and have one of their sides 9 disposed adjacent the opening through the said bolt. The cross grooves 8 preferably extend parallel with the sides of the nut and are disposed adjacent thereto, there being a groove for each of the sides of the nut.

The grooves 8 in the nut are formed with inclined outer sides, and flat or straight inner sides that merge into the opening through the nut intermediate their ends. The bottom of each groove is flat and is disposed at right angles to the straight inner sides thereof.

This nut is locked in position by a semi-dove-tail key 10 which is correspondingly shaped to the grooves and the same is adapted to be positioned therethrough. The key 10 is provided with a flat outer side 11 that is of a width equal to the width of the groove at the outer face of the nut, so that when the key is in position, this outer side will extend across the same.

In operation, when it is desired to lock the nut at any place along the threaded portion of the bolt, the key 10 is slid through one of the open ends of one of the grooves in the nut, that is disposed parallel with the flat surface 4 of the bolt. The flat surface of the key will be positioned adjacent the flat surface of the bolt, and when the projecting ends of said key are bent as shown in Fig. 2 of the drawings to prevent withdrawal of the key, the adjacent flat surfaces of the key and bolt will prevent the nut from turning thereon. By this arrangement it will be obvious that this nut may be adjusted on the bolt at every quarter turn of the same, there being a corresponding groove for each side of the nut. To release the key, it is only necessary to straighten one of the ends and the same may be easily withdrawn from the groove.

When the key is placed in position in the groove that is disposed parallel with the flat surface of the bolt, the inclined outer wall and bottom of the groove form a wedge in which the key is positioned to lock the same firmly in position and in such a manner that any additional movement of the nut will only increase the wedging action, thus tightly locking the nut on the bolt. Furthermore, this type of lock will not bite into the threads of the bolt in the edge of the same, thus greatly lengthening the life of the bolt inasmuch as the nut is easily attached to or detached from the bolt, without destroying the threads.

This nut lock forms a very simple, and economically manufactured device of this character, and can be locked on any part of the bolt either tight against the material, or loose to provide for expansion or contraction. In this type of nut lock it is totally unnecessary to force the inner face of the same against the material through which the bolt is positioned, as the nut can be securely locked on any part of the bolt.

From the foregoing description of the construction and operation of my improved nut lock, the manner of applying the same to use and the operation thereof will be readily understood, and it will be seen that I have provided a simple and efficient means for carrying out the objects of this invention.

I claim:

The combination with an externally threaded bolt having a longitudinally extending flat surface, of an internally threaded nut operatively engaging said bolt, the outer end of said nut being grooved parallel with its side edges and adjacent thereto, the outer side walls of said grooves being inclined toward the opening in said nut and terminating flush with the walls of said opening at the outer end of the nut, the inner side walls being straight and merging into the opening in said nut intermediate their ends, the bottoms of said grooves being flat and merging into said opening intermediate their ends, a key correspondingly shaped to the grooves and having a flat top adapted to be positioned in the groove parallel with the flat surface of the bolt to lock the nut in position, the flat side of said key engaging the flat surface of the bolt through the straight side of the groove to prevent mutilation of the threads on the bolt, and the inclined side and bottom of said key forming a wedge coacting with the inclined side and bottom of the groove to lock the key firmly in position and prevent the nut from turning, any additional movement of the nut serving to increase the wedging action.

In testimony whereof I have hereunto set my hand in the presence of two subscribing witnesses.

ARTHUR ASPLET.

Witnesses:
R. F. CROOKS,
H. E. DICKEY.

Copies of this patent may be obtained for five cents each, by addressing the "Commissioner of Patents, Washington, D. C."